Patented Jan. 2, 1934

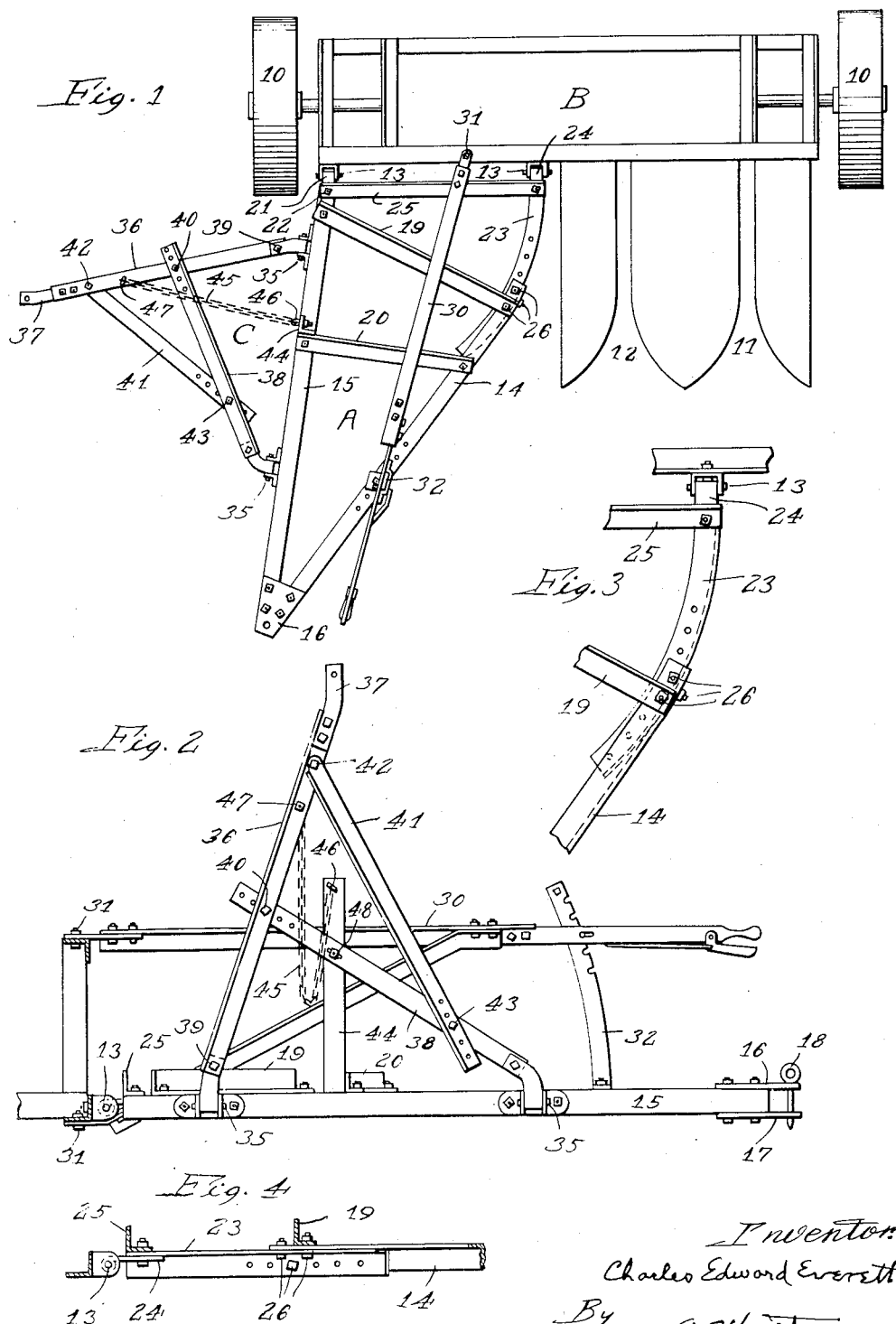

1,941,670

UNITED STATES PATENT OFFICE 1,941,670

HARVESTER HITCH

Charles Edward Everett, Racine, Wis., assignor to The Massey-Harris Company, Racine, Wis., a corporation of Maryland Application October 15, 1932. Serial No. 637,947

3 Claims. (Cl. 280—33.44)

My invention relates to hitches designed principally to be used on tractor pulled corn harvesters and the like. One of the objects thereof is to provide a hitch which can be easily and quickly adjusted at its front end transversely to the direction of travel, so as to accommodate different types of tractors and meet various operating requirements.

Another object of my invention is to provide a supplementary hitch adapted to pull the wagon into which the corn ears or other material may be delivered.

A further object of my invention is to provide a supplementary hitch which can be easily and quickly adjusted horizontally, and also to any desired height from the ground at its free end, and further to provide means whereby this hitch may be folded or raised to a vertical position and held in this position for the purpose of avoiding obstructions or for the purpose of passing through gates etc., while transporting the harvester from field to field.

It is also an object, to provide certain details and features of construction and combination of parts, tending to increase the general efficiency and convenience of operation of a hitch of this general type.

To these and other useful ends the invention consists in matter hereinafter set forth and claimed and shown in the accompanying drawing in which:

Fig. 1 is a top view plan of my invention, showing my improved hitch as attached to the frame of a conventional two row corn harvester.

Fig. 2 is a side view of my invention wherein the supplementary hitch is shown as folded or raised to a vertical position.

Fig. 3 is an enlarged fractional top view of my invention showing the hitch adjusting features.

Fig. 4 is an enlarged side view of the parts shown in Fig. 3.

As thus illustrated my improved hitch, which in its entirety is designated by the reference character A, is shown as attached to the main frame of a conventional corn harvester, which is designated in its entirety by reference character B, which, as illustrated is equipped at its ends with carrying wheels 10.

The ear gathering units designated by numerals 11 and 12 are mounted to one side of the frame B. To the other side of this frame my improved hitch is hingedly mounted as at 13, one hinge at the end of the frame and the other near the center thereof.

My improved hitch consists of side bars 14 and 15 which are preferably joined together at their front ends by means of plates 16 and 17. These plates are spaced apart thus forming an opening into which a tractor draw-bar may be attached in the usual manner by means of the lynch pin 18.

The bars 14 and 15 diverge rearwardly. The rear ends of which are joined together by means of end bar 19, forming preferably an oblique angle triangle frame structure. For the purpose of strengthening this structure the cross brace 20 is made fast to the side bars 14 and 15, preferably near the center thereof.

Bars 14 and 15 preferably extend a short distance rearwardly past end bar 19 as indicated. The rear end of bar 15 is made fast to hinge strap 21 by means of bolt 22. The bar 23 which is preferably curved on a radius with bolt 22 is made fast at its rear end to hinge strap 24. The rear ends of bars 23 and 15 are rigidly connected together through cross brace 25 by means of the hinge strap bolts.

The rear end of bar 14 is curved for a short distance so as to fit snugly over the sector 23, bolts 26 serving to securely bind these parts together in any position as provided for by a series of holes in the sector 23, whereby the front end of the hitch structure A may be moved and held in any desired transverse position. To make such an adjustment it being necessary only to loosen bolt 22 and remove bolts 26. The bolt 22 answering as an axis upon which the hitch is turned.

The lever structure 30 is preferably vertically hinged to the frame B as at 31. The lever anchor 32 is secured to bar 14 and the usual instrumentalities used whereby the lever may be moved to adjust the tilt of the frame B. When the hitch A is adjusted transversely the lever structure 30 must move transversely, but the anchor 32 must be moved into a different position on bar 14. A series of holes is therefore provided in this bar whereby the anchor may be held in a suitable position.

In harvesters of the class shown, it is customary to deliver the corn ears into a wagon which may be pulled by horses or hitched directly to the tractor or harvester hitch. I provide an improved supplemental hitch structure hingedly attached to the hitch A.

This supplemental hitch is designated in its entirety by the reference character C and is hingedly supported to hitch A as at 35. For various reasons it is frequently necessary to adjust the free end of the supplemental hitch both horizontally and vertically, for which purpose I provide novel means for making these adjustments and strengthening the hitch in a manner which will hereinafter appear.

I provide a beam 36 on the free end of which is supplied a wagon hitch clevis 37, and also a main brace 38 the outer end of which is supplied with a series of holes by means of which the beam 36 may be adjusted horizontally on the bolt 39 as an axis, the bolt 40 answering to make the brace 38 fast to the beam 36. A supplemental brace 41 is attached to the beam 36 as at 42 the inner end of which is attached to brace 38 by means of bolt 43. A series of holes in the brace 41 provide means by which the various beam adjustments on brace 38 can be accommodated. Thus it will be seen that my supplemental hitch can be easily adjusted on a radius with bolt 39 and provides a strong structure, a necessary requisite for a device of this kind. The brace 36 obviously will be held from bending at its center by brace 38 and the brace 41, having connections between the forward ends of 36 and 38, provides a frame structure suitable for the requirements. It will be understood that the wagon can be made to travel at various distances from the wheeled frame by adjusting the bar 36 forward or rearward; thus because of its angle the clevis 37 will be moved toward or from the hitch. When moving this clevis forward and toward the hitch the connection on the wagon pole can be changed so as not to change the position of the wagon in the direction of travel.

Thus the supplemental hitch C is adjustable horizontally and connected to the hitch A by spaced apart hinges forming a substantial structure which can be moved to any desired position horizontally. For controlling its vertical position I provide an anchor post 44 which is rigidly attached to the hitch A. A chain 45 is attached to the post as at 46 and to the beam 36 as at 47 whereby by changing the chain length the clevis 37 may be held any desired distance from the ground or the hitch C may be raised to a vertical position and attached to the post 44 as at 48.

From the foregoing it will be seen that I have provided a simple, strong, compact and easily adjusted main and supplemental hitch. It will of course be understood that the form shown herein for purposes of illustration, may be modified without departing from the spirit of the invention.

What I claim as my invention, and desire to secure by Letters Patent is:

1. A hitch of the class described in combination with a wheeled carrying frame, said hitch comprising a unitary frame structure, and a sector, said frame structure having an oblique angle triangle shape the rear long side of which is hingedly connected to said wheeled frame and having a connection to said wheeled frame at its rear short side by means of said sector the rear end of which is hingedly connected to said wheeled frame, the front end of said sector adapted to adjustably telescope said hitch whereby the front end of said hitch may be adjusted to different positions transverse to the direction of travel, means comprising a cross brace whereby said sector at its rear end is rigidly connected to the rear long side of said hitch adjacent its hinge connection to said frame.

2. A hitch of the class described in combination with a wheeled carrying frame, said hitch comprising a frame structure having an oblique angle triangle shape the rear long side of which is hingedly connected to said wheeled frame and having a connection to said wheeled frame at its rear short side by means of a curved bar the rear end of which is hingedly connected to said wheeled frame, the front end of said bar adapted to adjustably telescope said hitch whereby the front end of said hitch may be adjusted to different positions transverse to the direction of travel, a supplemental hitch comprising a forwardly and outwardly extending main bar having a vertical and horizontal hinge connection to said hitch, a rearwardly and outwardly extending main brace having a vertical and horizontal hinge connection to said hitch and an adjustable connection on said main bar substantially midway thereof, a secondary brace adjustably connecting the front ends of said main bar and main brace whereby the free end of said main bar may be adjusted to various positions horizontally, an anchor post rigidly connected to said hitch and having a flexible connection to the free end of said supplemental hitch whereby said free end may be adjusted to various vertical positions.

3. A hitch of the class described in combination with a wheeled carrying frame, said hitch comprising a unitary frame structure, and a connecting bar, said frame structure having an oblique angle triangle shape the rear long side of which is hingedly connected to said wheeled frame and having a connection to said wheeled frame at its rear short side by means of said bar the rear end of which is hingedly connected to said wheeled frame, the front end of said bar adapted to be adjustably connected to said hitch whereby the front end of said hitch may be adjusted to different positions transverse to the direction of travel, means comprising a cross brace whereby said bar at its rear end is rigidly connected to the rear long side of said hitch adjacent its hinge connection to said frame, a supplemental hitch connected to said hitch by means of hinges spaced apart, and means whereby said supplemental hitch at its free end may be adjusted horizontally, an anchor post rigidly connected to said hitch and means whereby the free end of said supplemental hitch may be held at a predetermined distance from the ground or held in an upright position by said post.

CHARLES EDWARD EVERETT.